Dec. 14, 1965  L. CARROZZA ETAL  3,223,850
PHASE ANGLE DIFFERENCE MEASURING CIRCUIT EMPLOYING
TUNNEL DIODE SIGNAL CROSSOVER DETECTING CIRCUITS
Filed Feb. 16, 1962  2 Sheets-Sheet 1
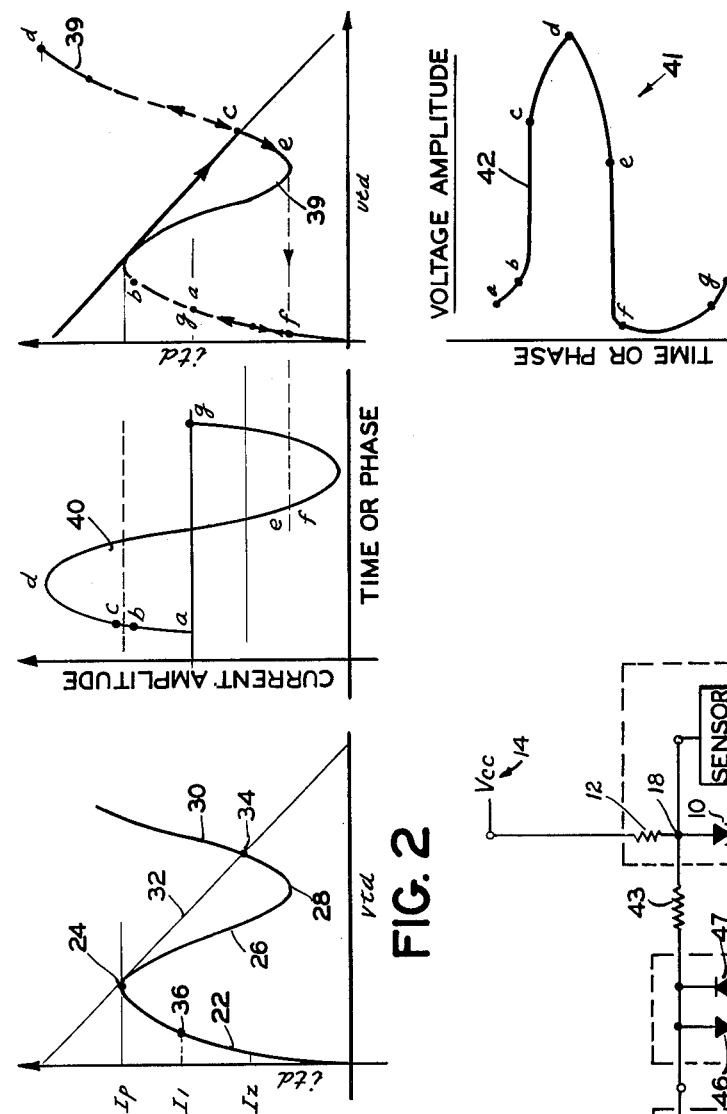
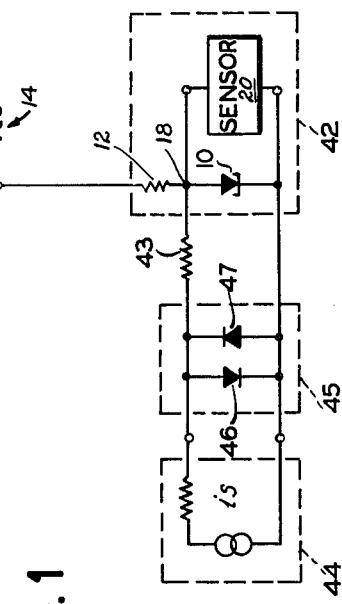
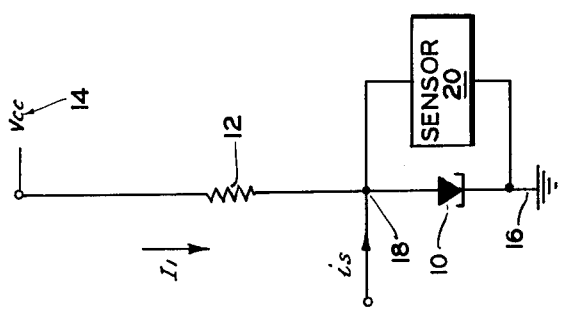
INVENTORS
LOUIS CARROZZA
LOUIS NASHELSKY
BY
ATTORNEY

INVENTORS
LOUIS CARROZZA
LOUIS NASHELSKY
BY
ATTORNEY

United States Patent Office 3,223,850
Patented Dec. 14, 1965

3,223,850
PHASE ANGLE DIFFERENCE MEASURING CIRCUIT EMPLOYING TUNNEL DIODE SIGNAL CROSSOVER DETECTING CIRCUITS
Louis Carrozza, Newark, N.J., and Louis Nashelsky, Bronx, N.Y., assignors to The Bendix Corporation, Teterboro, N.J., a corporation of Delaware
Filed Feb. 16, 1962, Ser. No. 173,720
6 Claims. (Cl. 307—88.5)

The invention relates in general to signal crossover measurements and more particularly to a signal crossover detecting circuit.

One object of the present invention is to provide a novel signal level crossover marking circuit which produces a voltage pulse coincident with a predetermined signal level crossover.

Another object of the invention is to provide a level marking circuit which may be used for phase angle measurement.

Another object of the invention is to provide a novel circuit to detect signal level crossover.

Another object of the invention is to provide a novel circuit to detect signal zero crossover.

Another object of the invention is to provide a novel signal level crossover and zero crossover detector having high sensitivity, and simplicity of signal level adjustment.

Another object of the invention is to provide a signal level crossover and zero crossover detector circuit employing inherently fast acting devices such as tunnel diodes.

Another object of the invention is to provide signal level crossover and zero crossover detectors which are substantially temperature stable.

Another object of the invention is to provide a plurality of signal level crossover or zero crossover detectors which vary similarly so that any variations due to temperature changes cancel out.

The invention contemplates level marking means comprising novel level detecting means for marking and detecting predetermined signal levels and which produces a sudden voltage change when the signal passes through the predetermined level, and differentiating means serially connected to the detecting means for differentiating the sudden voltage change. The novel detecting means comprises a tunnel diode having a volt ampere characteristic curve with first and second positive resistance regions separated by a negative resistance region and with a crossover point between each pair of regions, means for biasing the tunnel diode in the absence of a signal at an operating point in the first positive resistance region corresponding to predetermined signal level, means for applying the signal to the tunnel diode to shift the operating point from the first positive resistance region to the second positive resistance region to provide a sudden change in voltage across the tunnel diode, and means for sensing any sudden changes in voltage across the tunnel diode.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

In the drawings:

FIGURE 1 is a schematic drawing of a detector constructed according to the invention.

FIGURE 2 shows the characteristic curve of the tunnel diode used in the detector of FIGURE 1.

FIGURE 3 shows the derivations of a square wave output from a sinusoidal input using the curve of FIGURE 2.

FIGURE 4 is a schematic diagram of a crossover circuit including the detector of FIGURE 1.

Figure 5:
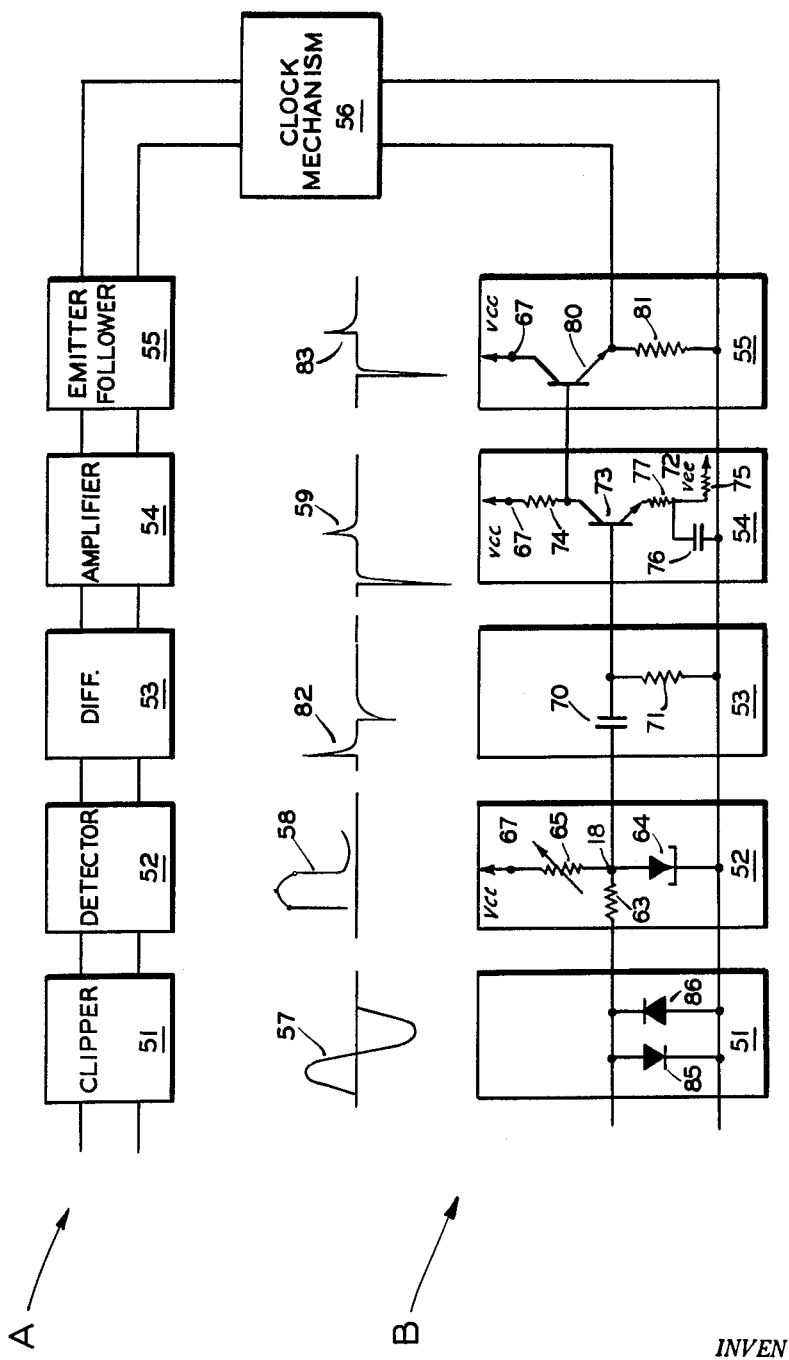
FIGURE 5 is a schematic diagram showing a phase angle difference measurement circuit using two novel level marking devices connected in parallel and each including a detector as shown in FIGURE 1.

Referring to FIGURE 1, there is shown a novel detector having a tunnel diode 10 and a bias resistor 12 connected in series between a source of excitation $V_{cc}$ 14 and a common potential 16. The resistance of bias resistor 12 and the magnitude of voltage source 14, in the absence of an external signal, provide a bias current $I_1$ for the tunnel diode 10. A current signal $i_s$ is applied to the biased tunnel diode as input terminal 18 between tunnel diode 10 and bias resistor 12. A voltage sensor 20 is connected across the tunnel diode to indicate when the current signal $i_s$ passes through a predetermined level.

The characteristic curve for the tunnel diode 10 is shown in FIGURE 2 with the current $i_{td}$ through the diode as ordinant, and voltage $v_{td}$ across the diode as abcissa. The characteristic curve has a positive resistance region 22, called the low forward conduction region, a crossover or peak point 24 corresponding to a peak current $I_p$, a negative resistance region 26, a valley or crossover point 28, and another positive resistance region 30 called the high forward conduction region. A load line 32, whose slope is determined by the value of bias resistance 12, intersects the high forward conduction region 30 at a point 34 which corresponds to current $I_z$. The magnitude of the quiescent or bias current $I_1$ determines the quiescent operating point shown as point 36.

The detector circuit operates as follows: Source 14 and resistor 12 are selected at such values to provide a quiescent current $I_1$ which locates the quiescent operating point 36 in the low forward conduction region 22 a distance from the peak point 24 corresponding to a predetermined current magnitude $I_n$, (i.e. $I_n = I_p - I_1$). A positive going current signal $i_s$ applied to the tunnel diode at input terminal 18 moves the operating point in the low forward conduction region 22 towards the peak 24. When the signal $i_s$ reaches and passes through the predetermined magnitude $I_n$, the operating point moves from peak 24 to the high forward conduction region 30 with a sudden increase in voltage across the tunnel diode. Sensor 20 connected across the tunnel diode detects the sudden voltage change.

The operation of the detector circuit for a periodic signal is traced in detail in FIGURE 3 with the aid of successive letters $a$ to $g$ appended to corresponding points on one cycle of input and output wave forms 40 and 41 and the tunnel diodes volt ampere characteristic curve 39. The dashed line on the curve 39 traces the movement of the operating point for a single cycle of input 40.

It is to be noted that there are two sudden changes in output voltage 41 for each complete cycle of input signal 40: (1) when the positive going signal passes through a magnitude equal to the predetermined level $I_n$ point $b$ to $c$, and (2) when the negative going signal passes through a magnitude equal to the valley current point $f$ to $e$.

The signal level detector as described can detect any level of a signal crossover by adjusting the source $V_{cc}$ 14 and the resistance of resistor 12. The former adjustment determines the positive going signal crossover level $I_n$, and the latter adjustment determines the negative going signal crossover level. Both of these adjustments are simple to make and the accuracy of the adjustment is easily checked with commonly available equipment.

For zero crossover detection, the bias resistance 12 is selected so that the bias current $I_1$ applied to tunnel diode 10 locates the quiescent operating point 36 at peak 24.

Thus, any signal going from negative to positive will produce and be accompanied by a sudden increase in voltage across the tunnel diode. For dual zero level detection of a sinusoidal signal, the intersection 24 and 28 both may be located at points on the characteristic volt-ampere curve. Thus both the positive going and negative going zero crossing of the signal are detected.

The sensitivity of the signal level crossover detection can be adjusted, as shown in FIGURE 4. Referring to that FIGURE, there is shown a signal level crossover detector 42 as shown in FIGURE 1 and a voltage signal source, shown by its Thevenin equivalent circuit 44. The crossover detector 42 is sensitive to current which moves the operating points on the tunnel diode's volt-ampere characteristic curve. The sensitivity of the signal level crossover detector may be increased and/or adjusted by the inclusion of a resistor 43 between juncture 18 and the signal source 44. For example, if the applied signal has a fixed voltage magnitude, a large current is applied to the tunnel diode by making resistor 43 small, and conversely a small current is applied to the tunnel diode by making resistor 43 large. Thus, the sensitivity of the signal level crossover detection is adjustable for a given voltage signal.

To prevent the tunnel diode from being overdriven by too large a current signal, a clipper circuit 45 is connected between the source 44 and the detector 42. The clipper is of a conventional type and may comprise two diodes 46 and 47 connected in parallel opposition across the output of signal source 44. The clipper circuit limits the input signal to a predetermined voltage amplitude, thus limiting the current amplitude applied through resistor 43 to tunnel diode 10.

An example of the importance of (1) the sensitivity adjustment, and (2) the clipper circuit is given below in the discussion accompanying FIGURE 5.

To summarize, there has been shown a signal level crossover detector capable of measuring two different signal level crossovers of opposite polarity, where both the level of signal crossover and the sensitivity of detection, are adjustable.

*Phase angle difference measurement circuit*

Phase angle difference measurement circuit shown in FIGURES 5 includes two basic novel level crossover marking circuits each comprising a detector 52 and differentiator 53.

A signal whose crossover level is to be marked is applied to junction 18 of resistor 65 and tunnel diode 64 and the signal produces a sudden change in voltage across the tunnel diode coincident with the signal passing through a predetermined level. The sudden change in voltage is applied to the differentiator circuit 53 comprising a capacitor 70 and a resistor 71. The differentiator circuit 53 converts the sudden change in voltage into a pulse, and a pulse occurs each time the signal passes through the predetermined level.

The circuit shown in FIGURE 5 is used to measure the phase angle difference between two sinusoidal signals and may be used for analog to digital conversion where the phase angle is an analog quantity. In particular, one level marking device A receives a signal of variable phase; and the other level marking device B receives a reference signal of fixed phase. Each level marking device, A and B, produces a pulse coincident with the positive going zero crossing of the associated signal. These pulses are fed into a clock mechanism 56 which may be of convenient or conventional type. One type of clock mechanism employs a constantly running high frequency pulse generator. A pulse from one signal level marking circuit, for example, the A marker, opens a gate in the clock mechanism which enables pulses to pass from the generator into a counter for recording. A pulse from the second level marking device B, closes the gate, blocking subsequent pulses from the generator to the counter. The phase angle difference between the two signals is readily counted from the frequency of the pulse generator, the number of pulses counted in the counter, and the frequency of the signals.

Also included in this figure is a series of waveforms 57, 58, 82, 59, and 83 graphically showing how the fixed phase sinusoidal signal is shaped in the several stages of the marking device.

The various blocks, or functional parts, of the level marking device A and B comprise a clipper 51, detector 52, which may be of the kind previously described, a differentiator 53, a first amplifier 54, and an emitter follower amplifier 55.

Referring to the wave forms shown in FIGURE 5 and to the details of the level marking circuit shown in schematic block drawing B (and disregarding the clipper circuit 51 for the moment), a signal 57 is fed through a sensitivity control resistor 63 which limits the current applied to the tunnel diode 64. The detector circuit 52 is of the type shown and described above, and converts the sinusoidal signal 57 into a square wave 58.

The differentiator network 53 formed by capacitor 70 and resistor 71 converts the square wave 58 into a pulse 82. Capacitor 70 performs a dual function and also blocks any direct electrical levels of subsequent stages from interfering with the operating point of tunnel diode 64.

The amplifier circuit 54 consists of a transistor 73 and a load resistor 74, serially connected to a source of excitation $V_{cc}$ 67. A D.C. stabilization resistor 75 is connected to a negative supply $V_{EE}$ 72, and capacitor 76 is a by-pass capacitor for emitter resistor 75. Resistor 77 is an unbypassed emitter resistor and increases input impedance to the amplifier 54. Amplifier 54 is biased non-symmetrically to provide a large negative pulse shown in wave form 59 at the amplifier output which corresponds to the positive zero crossing of the signal 57.

An emitter follower 55 comprising a transistor 80 connected to source of excitation $V_{cc}$ 67 and a load resistor 81 provides current gain to the amplifier signal 59 and allows for impedance matching with clock mechanism 56 without loading amplifier 54.

Thus, the input sinusoidal wave form 57 is converted to a square wave 58 by the detector 52 and is then differentiated into positive and negative pulses 82 by the differentiator circuit 53. These pulses are nonsymmetrically amplified in circuit 54 and then applied through an emitter follower 55 to clock mechanism 56. The negative pulse from the emitter follower shown on wave form 83 are coincident with the positive going zero crossing of signal 57.

The clipper circuit 51 protects the tunnel diode from being overdriven as described above and allows longer voltage swings of the signal. Diodes 85 and 86 clip the A.C. amplitude of the input signal 57 a predetermined amount.

The level marking circuits are shown with a detector circuit 52 which is of a novel type shown in FIGURE 1 and described above. It has been found that conventional types of detectors such as a Schmitt trigger or Multiar lack sensitivity, stability, and simplicity of adjustment found in the novel detector.

The accuracy of the level marking circuit cannot exceed the accuracy of detector 52. The accuracy of a circuit using level marking circuits (e.g. the phase angle measurement circuit of FIGURE 5) is never greater than the accuracy of the individual marking circuits. Therefore, it is desirable to have the detectors as accurate as possible.

Depending upon the application of the detector circuit and the level marking circuit, various parameters become important. In connection with the phase angle measurement circuit shown in FIGURE 5, there are three factors in addition to accuracy of level detection which increase the accuracy of phase angle measurements. They are: (1) signal level being detected, (2) amplitude of the signal, and (3) stability and tracking capabilities of tunnel diodes in the detector element.

In comparing two sinusoidal signals of the same amplitude for phase angle difference, any level on the sinusoid can be chosen as a reference. Practically, zero signal level is chosen because there is a greater change in signal level per unit change in phase at the zero crossing than at any other point on the sinusoid. Also, if the two signals being compared are of different amplitudes, it is essential that the reference level be zero. This is because phase angle varies with the amplitude of the signals. The relation between phase angle and signal level is expressed mathematically as follows:

$$I_n = \frac{A}{2} \sin \theta, \text{ and } \theta = \sin^{-1} \frac{2I_n}{A}$$

where:

$I_n$ = signal level
$A$ = peak to peak amplitude, and
$\theta$ = phase angle

Also, it follows from the above equation that the accuracy of phase comparsion is increased when the signal A is large. To allow the use of larger signal than may be safe for the tunnel diode, the clipper 5 is added in the circuit of FIGURES 4 and 5.

With regard to stability, tunnel diodes like all semiconductor devices vary with temperature. The peak point and peak current $I_p$ for a good temperature stable silicon tunnel diode varies from $I_p$ at $+20°$ C. to $I_p$ 20° C. $(1-.10)$ in a range of $+20°$ C. to $-50°$ C.; and varies to $I_p$ 20° C. $(1+.05)$ in temperature range of $+20°$ C. to $+100°$ C., and is temperature insensitive in the range of $+100°$ C. to $+200°$ C. It can be readily seen that the temperature variations of the tunnel diode will disturb the level of detection and zero crossover detection. Because phase angle of a sinusoid is related to amplitude, as defined above, an incorrect level detection is interpreted as a phase angle.

The problem of temperature instability can be minimized or avoided in either of two ways. One solution uses tunnel diodes whose characteristics change in like manner with change in temperature. This property is called tracking. Thus, when detector circuits having tracking tunnel diodes are submitted to the same change in temperature, the signal level being detected is a new value but the same value in all the detector circuits. When all signals are sinusoids of the same amplitude, no error is introduced. However, for signals of an appreciably different amplitude there is some error. By using tunnel diodes having tracking capabilities, a certain amount of temperature stability is incorporated in the measurement circuit described.

An alternative solution to avoid errors due to changes in temperature is to maintain the tunnel diode at a constant temperature such as in an oven. Or the tunnel diode can be kept in an environment where the temperature cannot vary below $+100°$ C. nor above $+200°$ C. and thereby operate the tunnel diode in an area of temperature insensitivity.

There are many applications for the detector circuit and the level marking circuit; and various minor changes required when using these circuits will be obvious to those skilled in the art. For example, if it is desired to detect the negative going zero crossing of a signal rather than the positive going zero crossing of a signal, the tunnel diode 10 shown in FIGURE 1 is reversed and the source of excitation $V_{cc}$ 14 is given a negative value relative to common potential 16.

Likewise, if we wish to produce a series of pulses one coincident with the positive zero crossing and the subsequent pulse coincident with the negative zero crossing, two level marking circuits are connected in parallel with a common input, one level marking circuit containing a positive going zero level detector and the other a negative going zero level detector. The output of the two marking circuits are fed into a summer device to combine the pulse corresponding to the positive going zero crossing with the pulse corresponding to the negative going zero crossing. An inverter amplifier is included in one of the marking circuits so that the pulses of both the positive and negative zero crossings are of the same polarity. Also, in such a circuit, the amplifier 54 is biased nonsymmetrically so as to pass the pulse corresponding to positive or negative going zero crossing and to reject any other pulses.

In certain applications, it has been found more convenient to rearrange the amplifier section of the marking circuit such as to interchange the emitter follower and the amplifier and as noted above to include an inverter amplifier, or to have the signal amplifier nonsymmetrically biased so as to pass a pulse of one polarity and to reject the pulse of the opposite polarity.

There are many different values of circuit parameters shown in FIGURE 4 in which the circuit functions satisfactorily. Since the circuit parameter may vary accordingly to design for any particular application, the following circuit parameters are included for the circuit of FIGURE 5 by way of example only.

Tunned diode 64: 1N2928
Transistors 73 and 80: 2N760
Diodes 85 and 86: 1N914
Resistor 63: 2K ohms
Resistor 65: 1K ohms
Resistor 65: 37K ohms
Resistor 71: 5K ohms
Resistor 177: 150K ohms
Resistor 74: 2K ohms
Resistor 75: 91K ohms
Resistor 81: 2.7K ohms
Capacitor 76: 50 micromicrofarads
Capacitor 70: 91 micromicrofarads
Magnitude of voltage excitation 57: 20 volts pk.–pk.
Power supply 67: +18 volts
Negative bias: —18 volts While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A circuit for measuring phase angle difference between two alternating current signals, comprising
    two signal level marking circuits each receiving one of the signals and each including
        detecting means having a tunnel diode having a volt ampere characteristic curve with first and second positive resistance regions separated by a negative resistance region with a crossover point between each pair of regions, means for biasing the tunnel diode in the first positive resistance region at an operating point correspond to a predetermined signal level, means for applying the signal to the tunnel diode to shift the operating point from the first positive resistance region to the second positive resistance region to produce a sharp change in voltage when the signal passes through the predetermined signal level in a given direction, and
        differentiating means to convert the sharp voltage change into a pulse coincident with the signal passing through the predetermined level, and
    a clock mechanism connected to the marking circuits for counting the time between two successive pulses.

2. A circuit for measuring phase angle difference between two sinusoidal signals, comprising two signal level marking circuits each receiving one of the signals and each including
> detecting means having a tunnel diode having a volt ampere characteristic curve with first and second positive resistance regions separated by a negative resistance region with a crossover point between each pair of regions, means for biasing the tunnel diode in the first positive ressistance region at an operating point corresponding to zero signal level, means for applying the signal to the tunnel diode to shift the operating point from the first positive resistance region to the second positive resistance region to produce a sharp change in voltage when the signal passes through zero signal level in a given direction, and
> differentiating means to convert the sharp voltage change into a pulse coincident with the signal passing through zero level, and a clock mechanism connected to the marking circuits for counting the time between two successive pulses.

3. In a circuit for measuring phase angle difference between two alternating signals of the kind described in claim 1 comprising a clipper circuit connected to the detector and adapted to receive the signal and limit its amplitude in an amount consistent with safe operations of the tunnel diode.

4. A circuit for measuring phase angle difference between two alternating current signals, comprising
a first signal level marking circuit receiving one of the signals and including
> detecting means having a tunnel diode having a volt ampere characteristic curve with first and second positive resistance regions separated by a negative resistance region with a crossover point between each pair of regions, means for biasing the tunnel diode in the first positive resistance region at an operating point corresponding to a predetermined signal level, means for applying the signal to the tunnel diode to shift the operating point from the first positive resistance region to the second positive resistance region to produce a sharp change in voltage when the signal passes through the predetermined level in a given direction, and
> differentiating means to convert the sharp voltage change into a pulse coincident with the signal passing through the predetermined level, and a second signal level marking circuit receiving the other signal and including
> detecting means having a tunnel diode having a volt ampere characteristic curve with first and second positive resistance regions with a crossover point between each pair of regions, means for biasing the tunnel diode in the opposite direction from the tunnel diode of the first signal level marking circuit and in the second positive resistance region at an operating point corresponding to a predetermined signal level, means for applying the signal to the tunnel diode to shift the operating point from the first positive resistance region to the second positive resistance region to produce a sharp voltage change when the signal passes through the predetermined signal level in a direction opposite to the given direction of the signal applied to the first signal level marking circuit, and
> differentiating means to convert the sharp voltage change into a pulse coincident with the signal passing through the predetermined level, and clock mechanism connected to the marking circuits for counting the time between two successive pulses.

5. A circuit for measuring phase angle difference between two alternating current signals, comprising two signal level marking circuits each receiving one of the signals and each including detecting means having a tunnel diode having a volt ampere characteristic curve with first and second positive resistance regions separated by a negative resistance region with a crossover point between each pair of regions, means for biasing the tunnel diode in the first positive resistance region at an operating point corresponding to a predetermined signal level, means for applying the signal to the tunnel diode to shift the operating point from the first positive resistance region to the second positive resistance region to produce a sharp change in voltage when the signal passes through the predetermined signal level in a given direction, and means connected to the marking circuits to determine the interval between the sharp changes in voltage.

6. A circuit for measuring phase angle difference between two alternating current signals, comprising two signal level marking circuits each receiving one of the signals and each including detecting means having a tunnel diode having a volt ampere characteristic curve with first and second positive resistance regions separated by a negative resistance region with a crossover point between each pair of regions, means for biasing the tunnel diode in the first positive resistance region at an operating point corresponding to zero signal level, means for applying the signal to the tunnel diode to shift the operating point from the first positive resistance region to the second positive resistance region to produce a sharp change in voltage when the signal passes through zero signal level in a given direction, and means connected to the marking circuits to determine the interval between the sharp changes in voltage.

References Cited by the Examiner

UNITED STATES PATENTS

| | | | |
|---|---|---|---|
| 2,900,534 | 8/1959 | Chater | 307—88.5 |
| 2,972,064 | 2/1961 | Hurlbut | 307—88.5 |
| 3,051,905 | 8/1962 | Morris | 307—88.5 |
| 3,062,970 | 11/1962 | Li | 307—88.5 |
| 3,105,913 | 10/1963 | Amodei | 307—88.5 |
| 3,108,229 | 10/1963 | Herzog | 307—88.5 |

OTHER REFERENCES

IBM Technical Disclosure Bulletin, vol. 2, No. 5, February 1960, "Current Overshoot Detector," page 53.

Electronic Industries, "The Tunnel Diode as a Pulse Generator," by Paul Mauch, pages 106–107, February 1961.

ARTHUR GAUSS, *Primary Examiner.*

JOHN W. HUCKERT, *Examiner.*